United States Patent
Davis

(12) 
(10) Patent No.: US 6,591,786 B1
(45) Date of Patent: Jul. 15, 2003

(54) DEVICE AND METHOD FOR SAFELY INSERTING AN ELECTRONIC DEVICE IN AN EAR OF A FOUR-LEGGED NON-HUMAN TRAINED ANIMAL

(76) Inventor: Eric R. Davis, 6085 NW. Primrose, Albany, OR (US) 97321

( * ) Notice: Subject to any disclaimer, the term of this patent is extended or adjusted under 35 U.S.C. 154(b) by 0 days.

(21) Appl. No.: 10/077,369

(22) Filed: Feb. 13, 2002

(51) Int. Cl.[7] .......................... A01K 15/02; A01K 15/04
(52) U.S. Cl. ........................................ 119/719; 119/905
(58) Field of Search ................................ 119/712, 715, 119/713, 714, 719, 759, 760, 905

(56) References Cited

U.S. PATENT DOCUMENTS

| | | | |
|---|---|---|---|
| 4,335,682 A | 6/1982 | Gouda et al. | 119/29 |
| 4,794,402 A | 12/1988 | Gouda et al. | 343/895 |
| 4,802,482 A | 2/1989 | Gonda et al. | 119/29 |
| 5,408,956 A | * 4/1995 | Quigley | 119/720 |
| 5,435,271 A | 7/1995 | Touchton et al. | 119/721 |
| 5,533,470 A | 7/1996 | Rose | 119/721 |
| 5,588,398 A | 12/1996 | Allen, II et al. | 119/822 |
| 5,605,116 A | 2/1997 | Kim et al. | 119/718 |
| 5,734,316 A | 3/1998 | Swanson, Jr. | 340/384.3 |
| 5,734,976 A | 3/1998 | Bartschi et al. | 455/333 |
| 6,006,699 A | 12/1999 | Keever | 119/795 |
| 6,073,589 A | 6/2000 | Curren et al. | 119/720 |
| 6,163,261 A | 12/2000 | Westrick | 340/573.3 |
| 6,167,843 B1 | 1/2001 | Kim | 119/720 |
| 6,170,439 B1 | 1/2001 | Duncan et al. | 119/720 |
| 6,232,880 B1 | 5/2001 | Anderson et al. | 340/573.3 |

OTHER PUBLICATIONS

Porkchop is Among Hero Dogs Combing Trade Center Tubble, Wall Street Journal, 9–25–01.
Wolves wireless Operational Link & Video Exploration System, from www.intpro.co.uk.
Product information from Inst–Mold Corporation, Oaks, PA.
Product Information on MICROeAR vhf from Phonak Communications.

* cited by examiner

Primary Examiner—Charles T. Jordan
Assistant Examiner—Judith A. Nelson
(74) Attorney, Agent, or Firm—Lori M. Friedman

(57) ABSTRACT

The invention discloses a system, device, and method for covert, wireless communication between a human handler and a trained animal. A small receiving unit is placed in a cured material which has conformed to the contours of a trained animal's inner ear thereby eliminating the need for an invasive method for implanting anything into the animals ear. The receiving unit has no external communication features such as wires or external antennae and thus it is covert. The transmitting unit may be hand-held by the animal's handler or used with a headset and attached microphone. Neither the transmitting or receiving units have any wires or external antennae that may be dangerously snagged while the animal is performing service or be noticed by any onlookers.

19 Claims, 6 Drawing Sheets

DEVICE AND METHOD FOR SAFELY INSERTING AN ELECTRONIC DEVICE IN AN EAR OF A FOUR-LEGGED NON-HUMAN TRAINED ANIMAL

BACKGROUND OF THE INVENTION

1. Field of the Invention

This invention relates to a system, device, and method for remote, electronic verbal, communication between a human handler and a trainable animal. The invention discloses a solution to many problems inherent in controlling trained animals remotely, for search and rescue, security, anti-terrorism, medical rescue, law enforcement or military purposes. More specifically, this invention deals with the covert control and training of dogs in various emergency situations.

2. Background of the Prior Art

In the prior art, animals have been controlled or trained by remote communications systems which where delivered by receivers which would stimulate, shock the animal or output audible alarms or beeps. These devices typically used a receiver device attached to a collar of the animal. Oftentimes, such a device required an antenna or similar device as described in U.S. Pat. No. 5,605,116 to Kim et al. A training device that uses an antenna protruding from the animal's collar could get caught on objects such as tree branches or similar obstacles that the animal may encounter. The invention described in '116 uses electric shock as negative reinforcement and allows a human voice to deliver positive reinforcement through a receiver.

Kim also discloses an animal training system in U.S. Pat. No. 6,167,843. In this art, Kim describes training signals, which can be sent from a handler's remote transmitter to a receiver attached to an animal. In this instance, Kim uses shock to stimulate the animal wearing a collar, which collar has a receiving antenna woven into fabric of said collar.

In U.S. Pat. No. 5,435,271 Touchton et al disclose a multi-channel animal control device which use radio signals and stimuli to keep an animal in a controlled area. '271 has no animal/handler direct communication as does the instant invention.

Much of the prior art involving animal training devices use external antennae and other covert attachments to an animal, such as U.S. Pat. No. 6,073,589 to Curen et al and several patents (U.S. Pat. No. 4,335,682, 4,794,402, and 4,802,482 to Gouda et al. Sounds and electrical stimuli are used to control dogs in these cases. The dog being controlled wears a collar. Another prior art patent, U.S. Pat. No. 6,163,261 to Westrick discloses a pet confinement system in which a dog receives stimuli through a collar. In contrast, the instant invention requires no animal collar, nor is the animal confined.

In U.S. Pat. No. 5,533,470 to Rose, a receiver, battery, and control circuit are combined in a nose clip for control of the animal. The instant invention uses no such device.

In U.S. Pat. No. 6,170,439 Duncan et al disclose a remote-controlled animal training system that employs both a collar-mounted stimulus receiver and electric stimuli to control an animal. The instant invention uses neither.

In U.S. Pat. No. 6,232,880 Anderson et al describe an animal control system using global positioning and instrumental animal conditioning which may have a device inserted in the ear canal of an animal. This art, however, uses aversive stimuli, a global positioning system, a dedicated computer system and is geared to the control and positioning of livestock. It is not akin to the animal/handler communication of the present invention.

Animal training devices that are not covert are typified by U.S. Pat. No. 6,006,699 to Keever. Keever uses a flexible leash to control and train a dog. The device depicted therein is not at all hidden or remote as is the instant invention, and features no method or device for covert control of a trained animal by a handler by a device easily placed in the animal's ear.

The need for covert control of trained animals has become newsworthy of late, due to the importance of rescue animals after the catastrophe of Sep. $11^{th}$ 2001. *The Wall Street Journal*, on Sep. 25, 2001 had an article entitled "Porkchop Is Among Hero Dogs Combing Trade Center Rubble" which describes what is believed to be the largest canine deployment ever. This operation used an estimated 350 dogs performing recovery and rescue at the World Trade Center disaster. The need for trained dogs to hear commands in such situations is of critical importance. In many cases where rescue dogs are employed, such as military, law enforcement, security, and the like the ability of the human handler to speak commands that are audible to the trained animal without others hearing them is extremely important.

In many environments in which the trained animals may be deployed, the ambient noise level may be extremely high due to the use of heavy equipment, shouting, or gunfire. Environments which produce echoing (such as stairwells), or high ambient noise levels may impair a handlers ability to communicate with a trained animal therefore increasing the chance of accidents as well as decreasing the efficiency of the team. The instant invention solves problems such as these by greatly minimizing these extraneous sounds to the trained rescue animal.

There is other art that was concerned with communicating with dogs. Among these are Allen II et al, who is U.S. Pat. No. 5,588,398 disclose a remotely controlled dog muzzle. This device is not covert in any way, and is equipped with stimulus generators and a cup-shaped snout that are used to control the dog. The instant invention uses no electronic stimuli or snout.

In U.S. Pat. No. 5,734,316 Swanson, Jr. involves simulating the presence of a canine partner by a police officer by a machine that barks. It is used by a policeman activating a mounted audio player in a patrol car, and although simulates the help of a canine to an officer covertly, is not by any means relevant to an actual canine. This patent demonstrates how important the work of a police dog is to the law enforcement community.

In U.S. Pat. No. 5,734,976 Bartschi et al disclose a micro-receiver for receiving a high frequency signal. Said receiver is designed to fit into the external auditory canal of a person. Also mentioned in this patent (column 3 line 10) is the ability of a people in certain situations, such as disaster relief workers or if a team's manager needs to communicate with players on a field. The microreceiver discussed in '976 is made by the Phonak Communications AG of Switzerland. A micro-receiver used as a receiving device in a preferred embodiment of the present invention is made by Phonak.

The instant use of the micro-receiver described in '976 differs from the use described in '976 because the receiving device of this invention is inserted in a mold that is placed in the vertical and horizontal canals of an animal's ear. As will be shown in the detailed description of this invention that follows, the custom-fitting operation of this invention is not trivial and requires the creation and use of a mold that is custom-fitted to the ear 4 of each animal 2 that is used in service.

The present invention provides a solution to the problem animal handlers have traditionally encountered in similar dangerous situations. There is a need to speak commands to the trained animal on a mission, when the small trained animal can fit into places that a larger (and less flexible) human handler cannot follow him. The present invention describes how a signal receiving device can be safely inserted in an animal's ear for purposes of commanding and controlling the trained animal. The handler uses a transmitting device, which may be hand-held or used with a headset and attached microphone, into which he speaks commands to direct the animal as he wishes. The handler may be up to one half mile away from the trained animal while the command and control activity is taking place. Since there are no wires, chains, leashes or similar visible, non-covert devices in this invention clandestine communication is achievable between handler and trained animal.

In this invention, a receiving device is embedded in a polymeric material which has been molded to the shape of the trained animal's inner ear, cured and then placed inside an ear of a trained animal. This procedure is non-invasive and is done without any discomfort to the animal and without the need for special tools or veterinary expertise. The molded ear piece is custom-fitted to the ear of each trained animal by the handler or other trained person. Once it is custom-fitted, as will be described herein, it may be removed from the animal's ear when not in use. This is not possible if a device is surgically implanted in the ear.

Additional advantages of being able to remove the molded ear piece include the ability to remove the receiving device to save battery usage, the ability to easily change the battery when it is spent, and for periodic cleaning of the animal's ear.

DEFINITIONS USED IN THE INVENTION

In this invention the term 'handler' will be used to mean the person who controls a trained animal.

A 'trained animal' or just 'animal' as used in the present invention, is a dog, horse, bear, wolf, or any other non-human animal that is used by humans to perform certain acts that are commanded to it to serve a purpose. The purposes of interest in the present invention may be search and rescue, law enforcement, military operations, and the like. Other reasons for the animal's training are entertainment, such as trained animals used for tricks, shows, or movies. A preferred species of trained animal employed in the instant invention is the canine or dog. More specifically, preferred dogs are represented by working and sporting breeds such as Labrador Retrievers, Chesapeake Bay Retrievers, German Shepherds, and the like.

In this invention the term 'moldable polymer' will refer to a two-part. polymer that is cured without heating, is water-resistant and able to hold an audio receiver in an animal's ear without discomfort. The polymeric material is also able to withstand the stress of frequent removal and reinsertion into the animal's ear. A preferred type of moldable polymer is a silicone polymer. A particularly preferred silicone polymer used for fashioning the ear mold is a two-part silicone polymer that is classified as RTV (room temperature vulcanizate).

In this invention, 'molded ear piece' will mean an audio receiver that is securely fitted into a moldable polymer which is placed in an animal's ear. The molded ear piece fits in the animal's ear because it is individually molded to the inner ear of the animal for exact fit. The exact fit is necessary for both efficient operation of the animal communication system of this invention and the comfort of the animal.

In this invention, the term 'non-invasive' will describe the way in which the molded ear piece is inserted into an animal's ear without the need for surgical procedures or other means that would permanently affect the animal's ear.

In this invention, 'emergency situation' will mean any situation which needs the services of a trained animal to aid human workers in search and rescue, security, anti-terrorism, medical, law enforcement or military purposes.

In this invention, the trained animal will be referred to with the pronoun 'he', whether or not the animal is male. There is no distinction given for the animal's gender; both male and female animals may be used successfully for purposes of this invention.

SUMMARY OF THE INVENTION

This invention relates to the control and training of animals by an electronic communication system between a handler and an animal. In a preferred embodiment, a handler uses a portable handheld voice transmitter. The handler may also be wearing a headset attached to a microphone into which he speaks commands. The animal hears the handler's commands through a small radio receiver that is custom-fitted into the animal's ear. The receiver is securely placed into the animal's ear, and is electronically linked to the handler's transmitter.

It is also possible that desired commands could be sent to the animal's receiving device by a computer-generated voice. The handler would be in control of such commands via a transmitting device, which would have prerecorded digital messages that elicit desired responses when played. Incorporation of such computerized voice commands delivered to the animal's ear could help standardize acceptable animal handling procedures. It would also enable another handler to command the animal in an emergency situation if the primary handler was hurt or disabled.

The possibility of certain animals responding to tones instead of human voice commands is also thought possible in the animal communication system of this invention. The possibility also exists that a team of animal handlers would be able to use transmitters with more than one channel. This would enable communication between human team members (handlers), as well as from a handler to an animal. There are many emergency situations where this feature would be very suitable The receiving device requires no external antennae. While the animal wears the molded ear piece of this invention, he has the ability to hear ambient noises other than the handler's voice in his other ear, so he can be aware of his surroundings. The handler delivers commands covertly and may be as far as one half mile away from the animal. The absence of an external antennae in the receiving device allows the system to be used in adverse conditions, the device, system and method of this invention negates the need for the animal to wear a collar of any sort, which is an advantage in many stealth operations.

DETAILED DESCRIPTION OF PREFERRED EMBODIMENTS

A major problem in animal deployment in emergency situations is safe and effective communication between an animal handler and the animal in various menacing situations. These situations may include search-and-rescue, criminal pursuit in law enforcement, military operations and the like, often performed by dogs. In most of these situations, the danger and space limitations of the work require the dog to be out of close contact with its handler, or in an environment of high ambient noise. In these types of situations, the ability of the dog to hear the commands of its handler is both critically important and very difficult. Another important criterion of animal-handler communication is the desire for the communication to appear covert. The latter is especially important in a noisy environment or when there is a need for stealth, the lack of which could result in a compromise to life and safety in difficult logistic situations, such as a search and rescue mission in an underground tunnel. In the latter type of situation, the dog cannot hear if the handler is more than about five feet away due to the echoing or garbling of sound. The handler's use of whistles or hand signals is not practical in this situation either.

Figure 1:
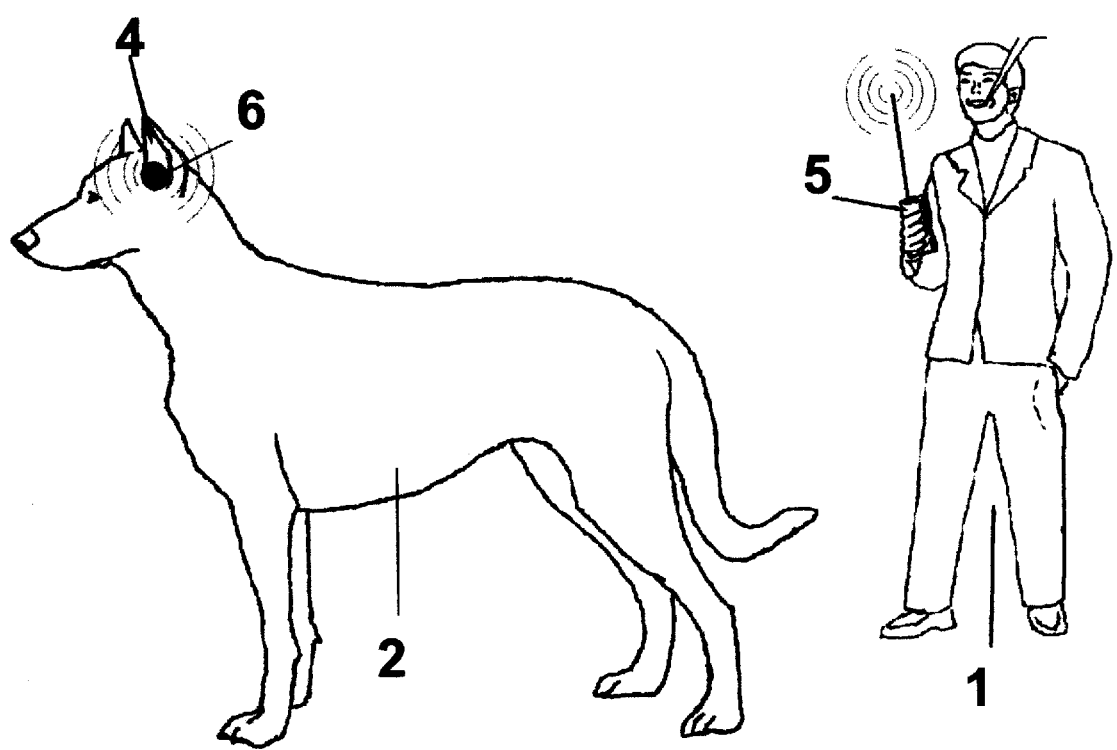
FIG. 1 is a schematic diagram of an animal handler communicating to a trained animal using a hand-held transmitting device.

The present invention presents a solution to this problem. As depicted in FIG. 1, a handler 1 is equipped with a transmitting device 5 which transmits voice messages from the handler 1 to the trained animal 2. The animal 2 has a receiving device of the invention 3, covertly placed in an molded ear piece 6. The receiving device 3 is fitted into an molded ear piece 6 placed in the animal's ear 4 before the animal 2 is placed in a dangerous situation.

In a preferred embodiment, a method of the present invention is carried out when the handler 1 speaks commands into a hand-held transmitting device 5. The trained animal 2 may be up to one half mile away from the handler 1 and still hear the handler's commands clearly. Since the transmitting device 5 and the receiving device 3 operate on the same frequency the covert nature of the handler/animal communication is somewhat protected, as the exact frequency (down to 2 decibels) would have to be known by an interloper. As long as the transmitting and receiving devices operate on the same radio frequency, the animal communication system of the present invention will work. In a preferred embodiment of this invention, the frequency used is in the range of 150–174 MHz. This frequency corresponds to the VHF business band range. The UHF business band is in the range of 450–475 MHz.

For the purposes of this invention, any frequency in either UHF or VHF may be used. VHF has a further range, but the band is more crowded, while UHF has a shorter range, a higher frequency, and is less crowded. In a small or rural area VHF is usually used, while a more populous area UHF would be recommended.

There are several noteworthy aspects of the present invention. One of the most crucial features of the instant invention is the ability to covertly place a receiving device 3 of this invention in the ear 4 of an animal 2. This is critical for many reasons, including the ability of an animal 2 to clearly hear a handler's 1 commands even when the animal and handler are not able to see each other or are within normal speaking distance. The necessity for the animal 2 to feel comfortable with the receiving device 3 in its ear 4, is the ability of the animal to follow commands in a dangerous situation with or without the knowledge of a tracked person who may be a source of danger.

Another noteworthy aspect of the present invention involves training the animal 2 to respond to its handler 1 when using the communication device system and method of the present invention. Even if the animal is well-trained, getting it used to hearing and obeying a handler's covert commands through an molded ear piece 6 which delivers the sound into the animal's vertical auditory canal 7 at the juncture of the horizontal auditory canal 8 close to the ear drum 9 requires additional efforts which will be described.

EXAMPLES i–iv

Attempts to Discover a Satisfactory Material for a Molded Ear Piece

Applicant performed extensive experimentation using different moldable polymers in order to find satisfactory materials and methods. Details of such experimentation are set forth herein.

In attempting to find a moldable material with in which to encase a small receiving device and position and hold it in an ear of an animal, applicant purchased material that appeared to be suitable candidates, The following is a description of the work that was done in that effort.

i) One of the materials used was a dental impression material. It is sold by the name "Magic Velvet". Following manufacturer's instructions, two impressions were made. The impression material was placed into the ear 4 of a dog and left to cure for three minutes. The impression was then fitted with the receiving device 3. The receiving device 3 was in placed in the dog's ear 4, a handler 1 using a transmitting device 5 attempted to command the dog to ascertain if the commands could be heard and obeyed.

In the case of dental impression material used as the molding material, successful communication between handler 1 and trained animal 2 was not possible. Results of the experiment showed that the material was too rigid to hold the receiver 3 in place in the ear 4. The surface of the dog's inner ear 13 was irritated by the rigid material and caused discomfort to the animal 2.

ii) Another attempt was made to create a successful molded ear piece using a product made by Westone Laboratories called "Silicone Singles". This material comes as a two-part silicone room temperature vulcanization (RTV) material which does not require heat to polymerize. Silicone singles was a two-part, pre-measured silicone polymer. The two parts (labeled A and B) were mixed according to manufacturer's directions. After mixing, the resulting polymeric material was kneaded by hand into a cone-like shape. The cone, while still moldable, was gently inserted into the animal's ear. It was held in place by the handler until it is set.

In the case of silicone singles, the material was removed from the animal's ear and left overnight to set. The material, after curing, was too weak and brittle to properly function as the molded ear piece of this invention. The material fell apart when removal of the piece was attempted.

iii) Several other attempts were made to use silicone RTV materials to make the molded ear piece of this invention.

One such attempt was made using a material sold as "Insta-Mold II" sold as a two-part silicone polymer made by the Insta-Mold Company, Oaks, Pa. Applicant attempted to make a mold using 3 teaspoons of the RTV silicone and 18 drops of the hardener. The material was shaped into a cone as described above and placed in the animal's ear for eight minutes to cure the material. The material was removed from the animal's ear and left overnight at room temperature to fully cure.

There were several problems with the molded material made from Insta-Mold II. The amount of polymer made from 3 tsp of silicone polymer yielded too much product for the animal that was being fitted. Also, the hardener to silicone ratio was inadequate for workability of the cured polymer.

iv) Another RTV silicone polymer was used in an attempt to arrive at a formula that would perform satisfactorily for applicant's intended use. Another material was "Insta-Mold FeatherWeight" also made by the Insta-Mold Company, Oaks, Pa. This product was in two parts, equal parts of which were mixed together as described above in Example iii. The mixed material was formed into a cone shape and placed in the animal's ear for eight minutes and then removed. The mold was left out overnight and had the best consistency of any of the materials used. (note: In the above four examples, the animal used for testing the RTV materials were dogs)

Using the Insta-Mold products for fabricating the molded ear piece of the present invention is quite different from the use that is the manufacturer's intent. The Insta-Mold line of products are designed to form custom-fitting ear plugs to be used as hearing protection devices in people. Applicant's use of the material as a molded ear piece holding a receiving device for a trained animal is indeed a novel use.

It is intended that any RTV polymer that can be custom-fitted in an ear of a trained animal 2 and be fitted with a receiving device 3 will be considered part of the present invention. Besides the silicone material from Insta-Mold that was used to make the molded ear piece 6 of this invention, a series of silicone RTV polymers are made by other manufacturers such as Polytek. These materials are two-part, condensation-cured substances which are thought to perform comparably with the Insta-Mold products described above.

Another important aspect of this invention involves training an animal 2 to respond to the commands of a handler 1 when the molded ear piece, 6 containing a receiving device 3 is in its ear 4. The following is a description of how animals 2 are trained to obey the commands of a handler 1 which are delivered from a transmitting device 5 to a receiving device 3 imbedded in a molded ear piece 6.

Formation of the Molded Ear Piece, Including Custom Fitting and Insertion of Receiving Device As can be seen from the above description, an RTV silicon polymer was deemed a satisfactory material for fabricating the custom fitted ear piece that will hold the receiving device 3 and make the molded ear piece 6.

Figure 6:
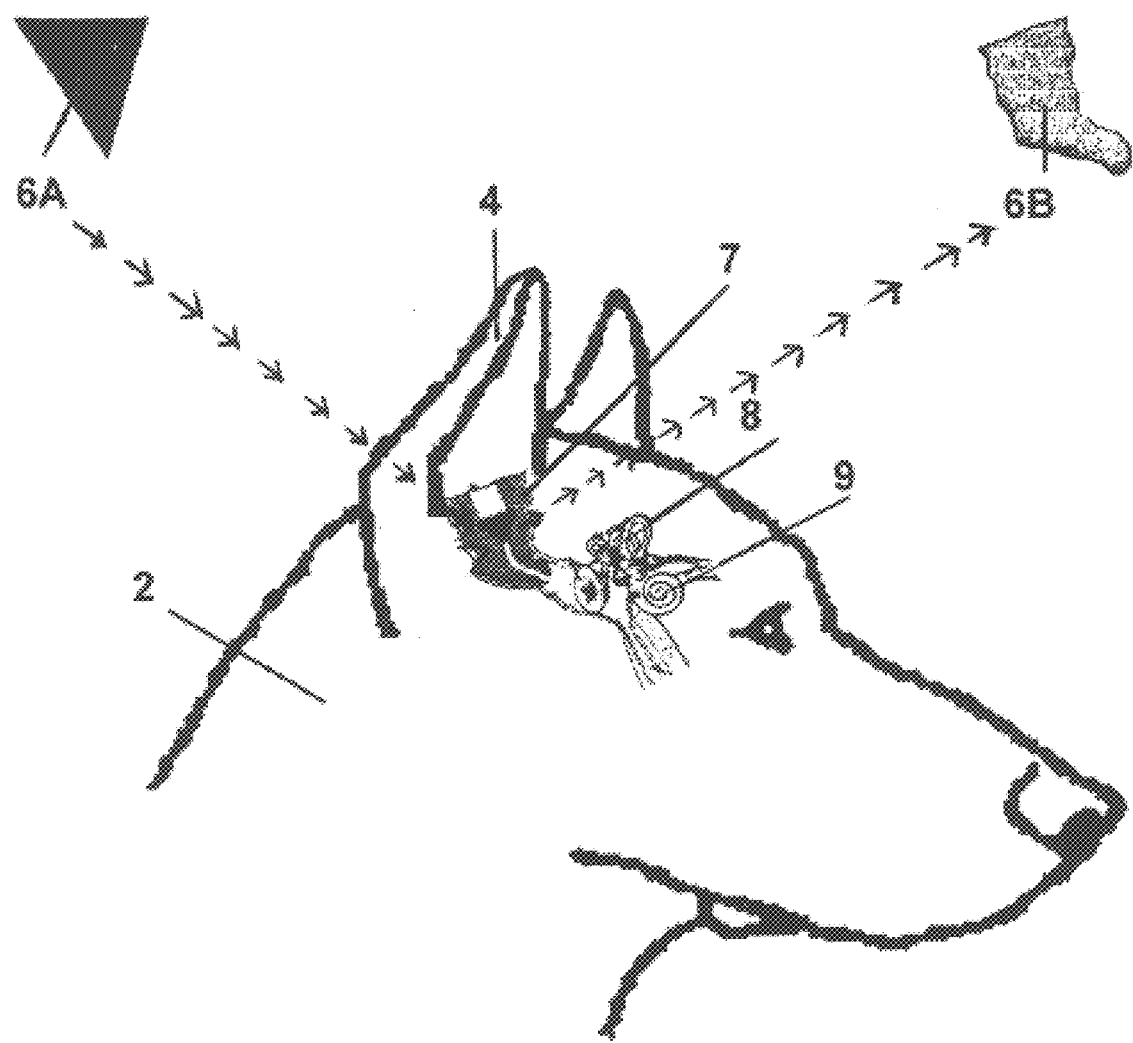
FIG. 6 depicts the moldable material being inserted in an animal's ear before fitting and the moldable material after fitting being removed from said ear.

The moldable material used to make the molded ear piece 6 was Insta-Mold II featherweight As described in the above section, this product comprised two parts, equal parts of which were mixed together as described. When the two parts of the moldable polymer, labeled part A and part B, were mixed, a soft plastic-like or rubbery material was formed into a cone shape with the fingers, shown as 6A in FIG. 6. Further shown in FIG. 6, after placing the cone shaped material into the ear 4 and waiting eight minutes, it was removed as 6B. As seen in FIG. 6, 6B is not cone-shaped but is shaped in an irregular fashion corresponding to the inner shape of the animal's ear 4. This irregularly shaped plastic shape will be referred to as the plastic ear shape 6B. After removal, the plastic ear shape 6B was left out overnight at room temperature to complete the curing process.

Figure 5:
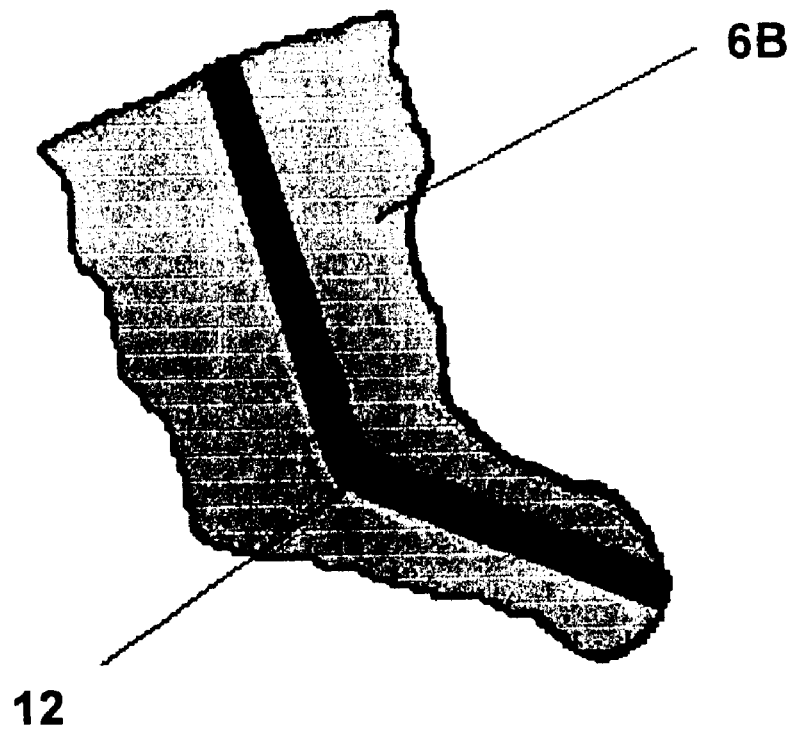
FIG. 5 depicts the moldable material after being fitted in an animal's ear showing the drilled hole before a receiving device is inserted.

After the plastic ear shape 6B was fully cured, the receiving device 3 must be inserted into it to make the molded ear piece 6. In order to do this, a hole 12 must be drilled in the plastic ear shape 6B. Since the size of the plastic ear shape 6B is relatively small (less than 4 inches if the trained animal 2 is a dog), a small hand drill (not shown) was used to drill a hole through the plastic ear shape 6B. The drilled hole 12 in the plastic ear shape 6B is shown in FIG. 5. The drilled hole 12 may be widened if necessary with a dremel tool, which is a small tool used to widen small holes, mainly used by hobbyists.

Figure 2:
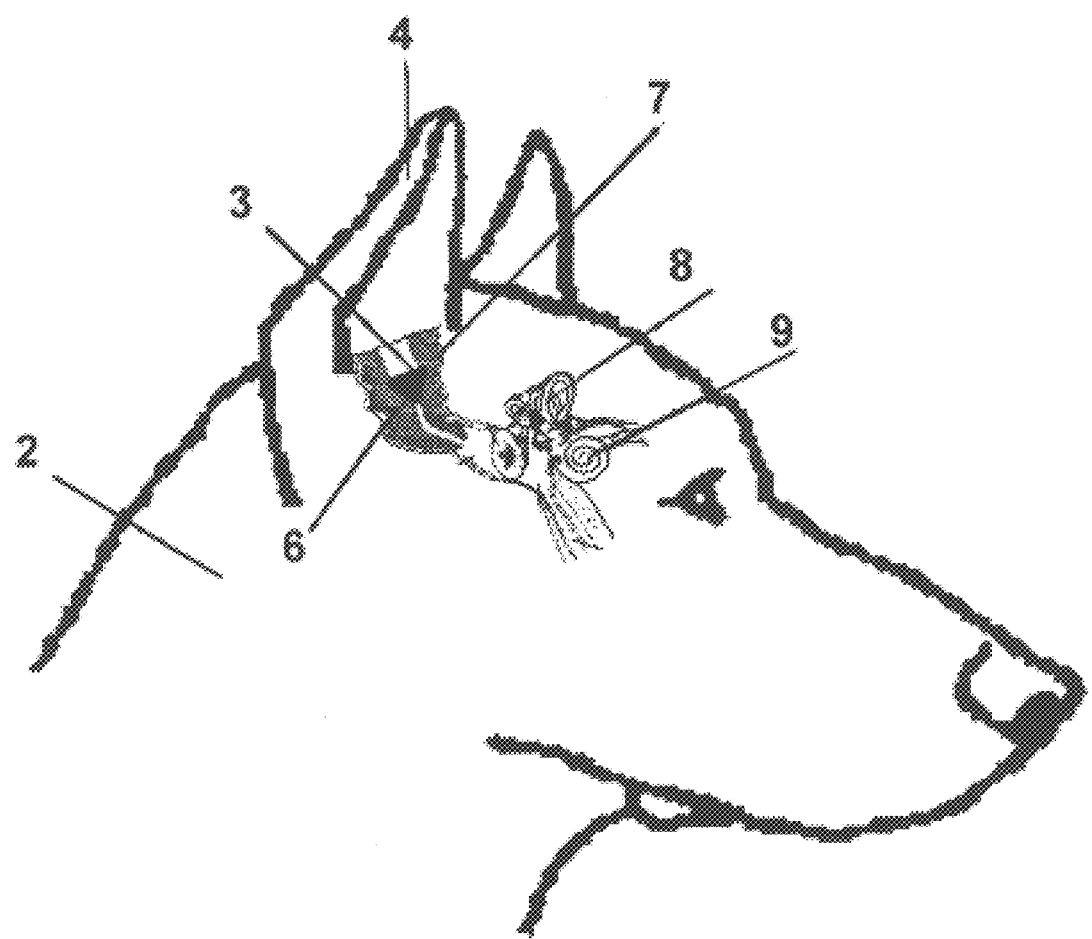
FIG. 2 is a diagram of the device of this invention placed in an animal's ear and depicting crucial features of the ear.

Referring now to FIG. 2 which depicts the anatomy of an animal's ear, it can be seen that the receiving device 3 placed in the molded ear piece 6 must be placed in the animal's vertical auditory canal 7 at the juncture of the horizontal auditory canal 8 close to the ear drum 9. The reason for the drilled hole 12 which may be widened in the plastic ear shape 6B is to securely hold the receiving device 3 in the animal's ear 4, is to allow the sound to reach the ear drum.

Custom fitting of the plastic ear shape 6B with the receiving device 3 to make the molded ear piece 6 that is placed in the animal's ear 4 is critically important to carry out the handler/animal communication system and method of the present invention. Tight custom fitting insures that the animal is comfortable while working, that the receiving device 3 remains in place, and that no ambient noise is allowed into the animal's ear 4 while in an emergency situation so he can hear commands of the handler 1 only.

In a preferred embodiment on the instant invention, the receiving device 3 that is inserted into the plastic ear shape 6B is a microEAR VHF miniaturized wireless communications receiver made by Phonak Communications AG of Switzerland. The device is equipped with features such as automatic squelch control, high sensitivity, noise filter, frequency control, volume control and similar features. The device is made for human use, allowing a hearing device to be inserted in the ear to allow the wearer to hear covertly what another person is saying.

Figure 3:
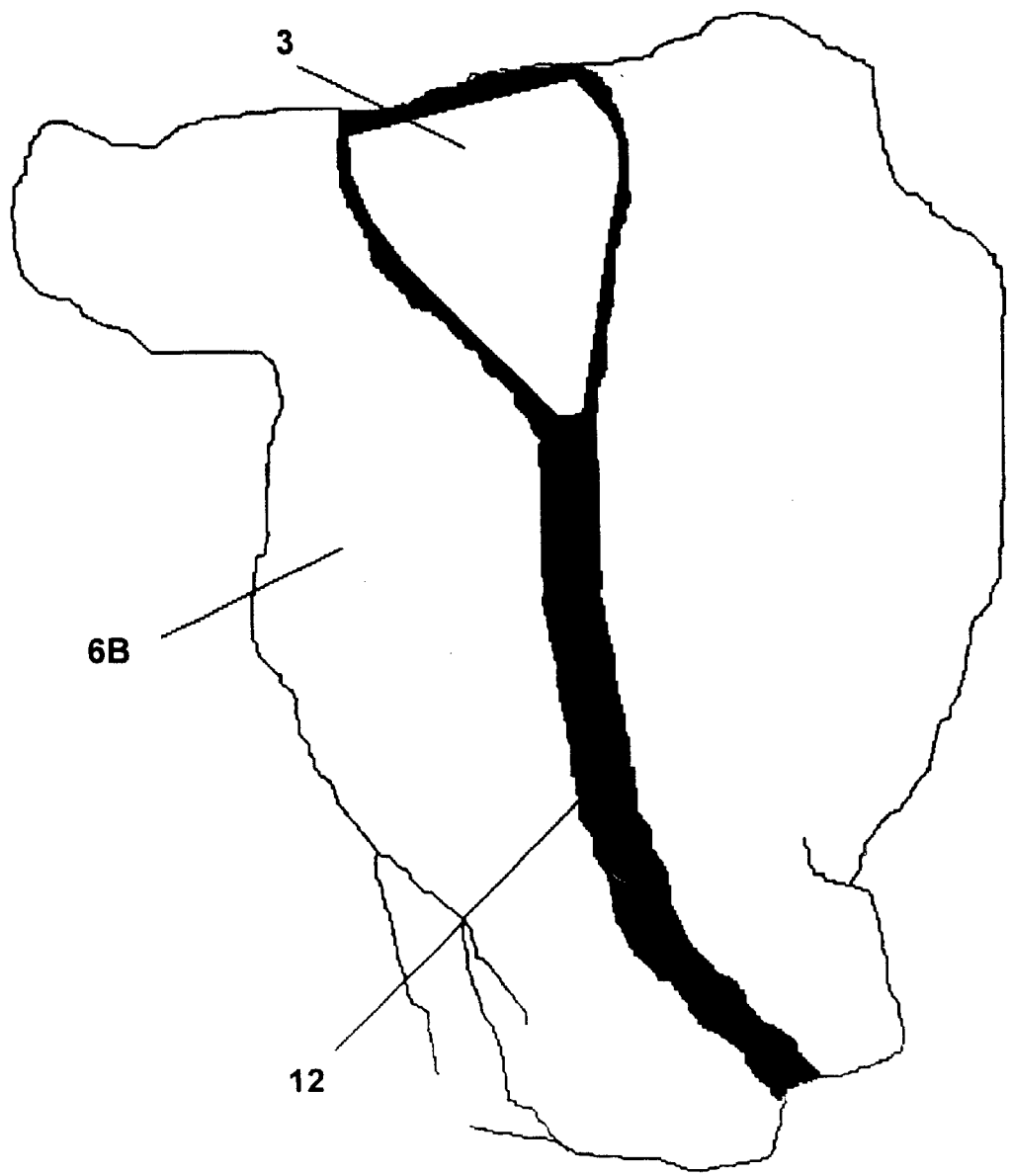
FIG. 3—is an enlarged, cross-sectional depiction of the receiving device of this invention in a cured and fitted moldable material in an animal's ear.
Figure 4:
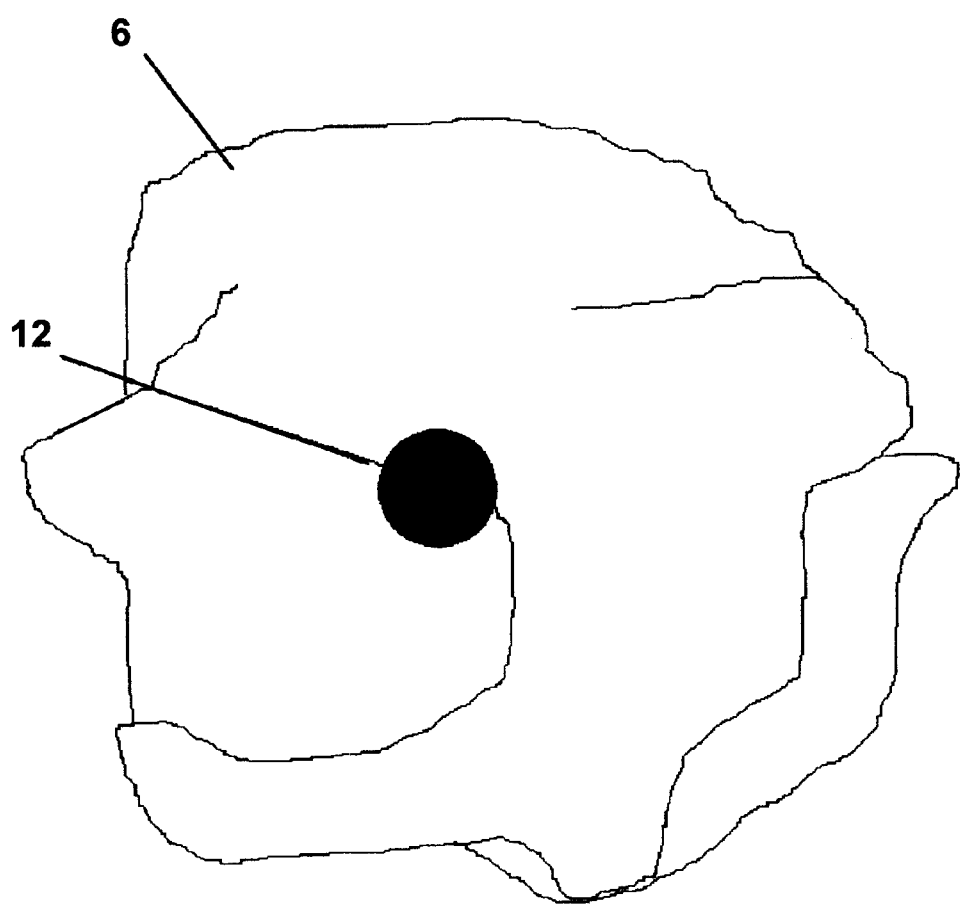
FIG. 4 is an enlarged top view of the external, out-of-ear depiction of the device of this invention.

The Phonak microEAR VHF used in the present invention is inserted into the plastic ear shape 6B which has been fitted to the internal contours of an animal's ear 4. After the plastic ear shape 6B cured and a hole 12 was drilled through it, the receiving device 3 was inserted into it as can be seen in FIG. 3. The measurements of the receiving device 3 inserted into the plastic ear shape 6B to make the molded ear piece 6 were 17.5×11×5 mm. It's total volume is less than one cubic cm, making it easy to be tucked safely away and used in the molded ear piece 6.

Training Animals to Respond to a Handler's Commands: the Animal Communication System of This Invention After an animal 2 is fitted with the molded ear piece 6 of this invention, there is a need for training him to respond to a handler's 1 commands received through it. The following is a description of the training procedures used by applicant to training animals. In this description, the animals trained were dogs.

It is recommended that the molded ear piece 6 is introduced to an animal 2 while he is in a relaxed mood. An example of this would be introducing the piece while-the animal is playing a familiar game or receiving a well-liked treat. This lessens the apprehension and distraction that the animal 2 feels when something new and different, like the molded ear piece 6, is introduced. After introduction, the molded ear piece 6 should be placed in the animal's ear 4 for short periods of time about twice a day. A preferred period of time in this training period is from 10 to 15 minutes. Depending on the temperament of the animal 2 and the handler 1, the time periods and number of times that the molded ear piece 6 is placed in the animal's ear 4 may vary. The goal of the training program is to eventually have the molded ear piece 6 in the animal's ear 4 with no apprehension whatsoever.

Once the animal 2 is used to having the molded ear piece 6 in its ear, training him to respond to a handler's 1 commands is necessary. In the following example, the animal used is a dog. The particular dogs that were used in the training exercises described were both male and female and ranged in weight from about 65 to 100 pounds. They ranged in height from about 20 to about 30 inches at the shoulders. The breeds used for this exercise were three Labrador Retrievers, and a Chesapeake Bay Retriever. The dogs were put on a standard six-foot lead so that they can remain close to the handler to help while getting used to hearing commands through the molded ear piece 6. Physical closeness is important because of the newness of hearing commands through the molded ear piece 6 and the reinforcement received from the handler in case of anxiety.

It is important for the handler to practice giving the voice commands to the dog in a low voice. This is significant because the receiving device 3 is capable of picking up low sounds and will aid in covert use at a later date.

Continuing the training procedures, the distance between the handler 1 and the animal 2 is gradually increased, up to the end of the six-foot leash to which the animal is attached. After the six-foot leash the dog can be used on a long line(up to 20 feet). If the handler and dog are used to using an electric collar, which can be used to correct improper responses, this can be used as soon as the dog is confident with the new system.

Performance of Trained Animals Responding to a Handler's Commands Illustrating the Method of This Invention The dogs that were trained as described above were put through exercises simulating motions that they would need to perform in various dangerous or intense situations. The exercises demonstrate that the animals 2 receive and obey commands received by the molded ear piece 6 in various simulated danger situations. In these situations, a dog 2 receives commands at various distances from the handler 1 in various conditions.

The commands used in this exercise were using the working and sporting breeds of dog, as specified above. The Advanced Training Protocol (ATP) was used in both Coarse Motor Commands and Fine Motor Commands. These are easily summarized in Table 1, below:

| Motion Desired | ATP Command |
| --- | --- |
| Forward motion | Forward |
| Left | Left |

| Motion Desired | ATP Command |
| --- | --- |
| Right | Right |
| Stop | Stop |
| Search | Search plus Direction (left or right) |
| Change Speed | Slow/Fast |
| Change orientation of locomotion | Crawl/Climb/Swim/Jump |
| Pick-up/drop | Fetch/Place |
| Open Search | Free Search |
| Go to Cover | Hide |

Scenario I (Military Use)

In this scenario, terrorists, with unknown weapons, are holding a large warehouse complex in a small town in the United States. Terrorist strength is unknown and it is also unknown if they are holding hostages.

In this case a trained dog, more specifically, a Military Working Dog 2 and handler 1 are involved. The dog 2 was trained in the ATP (advanced training protocol) and a molded ear piece 6 of this invention was placed in his ear 4. The dog was also equipped with the WOLVES (Wireless Operational Link Video & Exploration System) video system. This system is provided by the International Procurement Services (Overseas) Ltd in London, England. (http:://intpro.co.uk/ipsves.htm). It is a system developed for specialist police and military operations where a video and audio-equipped dog can provide vital strategic intelligence to human team members.

A Special Operations team with full compliment of weapons, several Scout/Sniper teams, one Captain in command. The dog 2 in this version of the ATP was trained to quietly lie down when he scented a person or people behind closed doors. He is also trained to carry and place remotely detonated "Flash Bangs" which are munitions devices that create loud noises and bright lights, for the purpose of distraction.

The captain instructs the various members of his team on upcoming procedures, including the handler 1 and the dog 2. Other personnel are instructed to guard the warehouse's two doors, numerous windows, and several exterior surveillance cameras. The captain orders disablement of electric power and the surveillance cameras.

It is desired to have the dog 2 enter the warehouse building through a fire escape on the building's second floor deck. The dog 2 is equipped with a video camera that is part of the aforementioned WOLVES system (not shown). The video that the dog collects was fed through wrist monitors worn by human members of the military unit. The human team members proceed to cut power, open a window for the dog 2 to enter as directed by the Captain.

When given clearance to do so the dog 2 is permitted entrance into the occupied warehouse. After entering, the dog 2 alerts the handler 1 that there is person or persons behind a particular door. After giving the alert, various members of the military unit proceed, including the dog 2 and handler 1 according to the captain's commands.

The dog 2 is instructed by the handler 1 to enter the room and crawl, right, forward, stop. After it was determined that there were rifle crates in the room, the handler 1 instructs the dog 2 to move on. In a similar fashion, the dog 2 is directed by the handler 1 to move in various directions to investigate other locations in the occupied warehouse.

This example demonstrates that the safety margin for a military team is raised by having a trained dog 2. The dog can more easily enter a potentially dangerous environment without having humans enter the building. The dog can transmit intelligence safely, via video surveillance, to the humans and also can discretely place munitions devices in the occupied building.

Scenario II (Rescue Use)

In this scenario, a building was bombed. It is partially collapsed and there were numerous people trapped in the building. The trained animal 2 is a dog who has been trained according to the ATP procedures described above and is equipped with a molded ear piece 6 in his ear and the WOLVES by International Procurement Services as mentioned above. The handler 1 is accompanied by several additional people including an incident commander (IC), a safety engineer, an Explosives Ordinance Dispatcher (EODI who is a member of a bomb squad team. In this scenario, the dog 2 was trained to bark in place when a victim was found.

During a briefing, the :IC initially sent in the dog 2 first to check for structural stability before sending any human rescuers. The structural engineer, EOD, and the handler 1 stay outside and watch the video feed that is gathered by the dog 2.

Using the method of this invention, the handler 1 commands the dog 2 forward, left, forward, right by speaking commands into his transmitting device 5. The human members of the rescue team communicate with the handler 1 as to where they want the dog 2 to go. The handler 1 commands the dog 2 to move in various directions according to the desires of the team who are observing a video feed supplied by the dog 2 as he moves through the site.

In this instance, when the EOD notices a possible explosive device, the handler 1 instructs the dog 2 to move closer to it. When it is determined that disarming the explosive device is possible, the IC sends in EOD and instructs the handler 1 to bring the dog 2 out. After the EOD disarms the device, the handler 1 sends the dog 2 back in to "free search" for victims. In this type of situation, the dog 2 can find victims by scent when they may not be visible to human eyes.

In this example, the dog 2 was able to more easily check the damaged structure before human rescuers were allowed to enter site. In this scenario, the dog could determine the location of both explosive devices and victims before any rescuers could be injured.

Specification of the Transmitting Device, Receiving Device and the Radio Communication Between Them The animal communication, system and method of this invention have been mentioned previously. The following detailed description will complete the specific tools used and perceived by applicant to be his invention.

Concerning the receiving device 3 that is imbedded in the molded ear piece 6, the device used in this manner must be small enough to fit in the animal's ear 4 without pain, discomfort or noticability. Applicant has successfully used an ultra-miniature radio receiver made by the Phonak Company called the MicroEAR VHF. The device is made to be used in a person's ear and used as a receiver for one way communication between people.

The features of this receiver are designed for such a use, including automatic squelch control, high sensitivity, a noise filter, automatic frequency control (AFC), and volume control. The receiver also is a FM receiver which operates in the VHF FM communications in the 150–174 MHz band.

The phonak MicroEAR receiving device is well-suited for the instant invention because its battery is a long life (30 hours) one. The receiver is strong enough to receive signals up to about a half mile from the transmitter. There are no visible wires or external antennae that would interfere with covert operations that are part of this invention. Another feature of the invention is the removability of the receiver 3 from the molded ear piece 6. Because it is removable, the receiving device 3 can be taken out of the animal's ear 4, and out of the molded ear piece 6 and shut off to save battery life.

Concerning the transmitting device 5 of the present invention, applicant has successfully used a programmable FM transmitter made by Motorola, with the designation CP-50 Radius. Since the receiving device 3 is preset to a frequency in the range from 138–190, it was found that a frequency of 171.905 was operable. The transmitting device used in the present invention is a radio, which transmits sound through space by means of electronic radio waves of the frequencies that have been specified herein. The radio may be either hand-held or used with a headset and attached microphone.

As the FCC has various radio bands designated for particular uses, it was found that a usable frequency band for purposes of the instant invention is designated as a 'business band'. The VHF business band is in the range of from 150–174 MHz and the UHF business band is in the range of from 450–475 MHz. The use of a VHF or a UHF band depends on the location of the transmitting and receiving devices; rural areas usually favor a VHF band while an urban location would use an UHF frequency. The system, device and method of the present invention would be applicable to both VHF and UHF business band radio frequencies. In the case of military or government use government controlled frequencies.

Suitable instruments that may be used as a transmitting device of the instant invention include 'off-the-shelf' programmable hand-held items made by Motorola, Bell, Fischer, GE, Goldstar, Hitachi, JVC, Magnavox, Mitsubishi, NEC, Panasonic, Phillips, Quasar, Radio Shack, and the like.

As long as the receiving device 3 and the transmitting device 5 are set to operate on the same frequency, and that frequency is one allowed by the FCC for business band use, they will be operable in carrying out the animal communication device, system, and method of the present invention.

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

What is claimed is:

1. A method for custom-fitting a moldable polymer in the ear of a four-legged non-human trained animal by a human handler for the purpose of securely holding a small, sound-enhancing electronic device proximal to the animal's eardrum aiding in clear and distinct sound transmission comprising the steps of
   a) inserting a cone of room temperature vulcanizate (RTV) polymer in the animal's ear;
   b) leaving the RTV polymer in the animal's ear to conform to the contours of the ear for a number of minutes;

c) allowing the semi-cured ear-shaped RTV polymer to be left undisturbed for a number of hours to finish curing;

d) drilling a hole into the fully cured ear-shaped RTV polymer from one end to the other end and e) widening the hole in the cured ear-shaped RTV polymer at one end to allow insertion of the small electronic device, f) inserting the small electronic device into the hole in the cured ear-shaped RTV polymer;

g) inserting the cured ear-shaped RTV polymer containing the small electronic device into an ear of the four-legged animal by the handler.

2. The method of claim 1 wherein the RTV polymer used is a two part polymer that is condensation cured and that is left in the animal's ear, conforming to its shape, for a period of about ten minutes.

3. The method of claim 1 wherein the hole that is drilled into the fully cured ear-shaped RTV polymer is fitted with an electronic device and then placed in the animal's vertical auditory canal at the juncture of the horizontal auditory canal and the ear drum enabling the animal's ability to hear sounds carried by said electronic device.

4. The method of claim 3 wherein custom fitting of the fully cured ear-shaped RTV enables a) the four-legged, non-human trained animal to be comfortable wearing the ear-shaped RTV polymer;

b) the electronic device to stay in place in the ear-shaped RTV polymer while in the four-legged, non-human trained animal's ear;

c) no ambient noise to reach the four-legged, non-human trained animal's ear that is fitted with the ear-shaped RTV polymer;

d) the four-legged non-human trained animal to hear a handler's commands through the electronic device in the ear-shaped RTV polymer.

5. The method of claim 1 wherein the animal fitted with the ear-shaped RTV polymer is a four-legged, non-human animal trained to respond to a handler's commands in emergency procedures selected from the group consisting of military operations, law enforcement, anti-terrorism, search and rescue, and medical rescue.

6. The method of claim 1 wherein the steps recited are done non-invasively causing no pain or discomfort to the four-legged, non-human trained animal.

7. The method of claim 1 wherein the device inserted and secured in the molded polymer is an electronic receiving sound enhancing device with a total volume of about one cubic centimeter.

8. A method for communicating covertly with a four-legged, non-human trained animal comprising embedding an electronic device in the animal's ear by inserting an uncured polymeric shape therein, leaving said polymeric shape in the ear for curing and conforming to the shape to the animal's inner ear for a period of time, completing the curing process by removing the polymeric shape from the ear and leaving the shape undisturbed outside of the animal's ear for a period of time until the curing is complete, followed by inserting an electronic device into the cured polymeric shape, and replacing the cured shape and electronic device in the animal's vertical auditory canal proximal to its eardrum, and removing the polymeric shape and electronic device from the ear by the animal's handler at his discretion.

9. The method of claim 8 enabling the four-legged, non-human trained animal to clearly hear and respond to commands received by the electronic device in the cured polymeric shape in one of its ears without interference from ambient noise, extraneous sounds and echo, while able to hear said ambient noise in its other ear.

10. The method of claim 8 wherein the molded polymeric shape and electronic device embedded therein are easily removable by the handler with no discomfort to the four-legged non-human trained animal into whose ear it is embedded.

11. The method of claim 8 wherein the electronic device that is safely and securely embedded in the molded polymer placed in the ear of the four legged, non-human trained animal will not be dislodged when said animal is required to move rapidly.

12. The method of claim 8 wherein the four legged, non-human trained animal is used for purposes selected from the group consisting of military operations, law enforcement, anti-terrorism, search and rescue, and medical rescue.

13. The method of claim 8 wherein introducing the molded polymeric ear shape to the four-legged, non-human trained animal done in gradually increasing time periods until a sufficient comfort level is achieved so that the shape is accepted and head shaking to dislodge the shape does not occur.

14. The method of claim 8 wherein the four-legged, non-human trained animal clearly hears commands spoken remotely by a human handler through the electronic device securely embedded in the molded polymer in its ear.

15. A device that is custom-fitted in an ear of a four-legged, non-human trained animal comprising a moldable room temperature vulcanizate material made from the insertion of a cone shaped, uncured form of a room-temperature vulcanizate polymer into an animal's ear, removal of said vulcanizate after about ten minutes after it has molded to conform to the shape of the animal's inner ear;

after which time the molded RTV polymeric ear-shaped is removed from the ear left undisturbed for several hours to completely cure, after which time a hole is drilled into the cured vulcanizate for the secure insertion of an electronic sound receiving and enhancement unit in said cured vulcanizate.

16. The device of claim 15 wherein the room temperature vulcanizate is a two-part silicone polymer.

17. The device of claim 15 wherein its placement in the four-legged, non-human animal's ear is in near proximity to its eardrum so that the animal can hear commands of a handler in the ear holding the device while the other ear hears ambient noises.

18. The device of claim 15 wherein the animal fitted with the ear-shaped RTV molded and cured polymer is a four-legged non-human animal trained in emergency procedures selected from the group consisting of military operations, law enforcement, anti-terrorism, search and rescue, and medical rescue.

19. The device of claim 18 wherein the electronic sound-receiving unit is securely held by the molded and cured ear-shaped RTV so that it remains safely in the animal's ear and does not dislodge when the animal performs emergency procedures.

* * * * *